(No Model.)

F. G. HESSE.
HYDRAULIC STEP.

No. 385,460. Patented July 3, 1888.

Witnesses,

Inventor,
F. G. Hesse.
By Dewey & Co
Attys.

N. PETERS, Photo-Lithographer, Washington, D. C.

UNITED STATES PATENT OFFICE.

FREDERICK G. HESSE, OF OAKLAND, CALIFORNIA.

HYDRAULIC STEP.

SPECIFICATION forming part of Letters Patent No. 385,460, dated July 3, 1888.

Application filed September 10, 1887. Serial No. 249,399. (No model.)

*To all whom it may concern:*

Be it known that I, FREDERICK G. HESSE, of Oakland, Alameda county, State of California, have invented an Improvement in Hydraulic Steps; and I hereby declare the following to be a full, clear, and exact description of the same.

My invention relates to the class of step-bearings for shafts, and particularly to that form which may properly be termed "hydraulic," and which consists in forming the step of water, which either partially or wholly supports the weight or thrust of the shaft.

My invention consists, essentially, in a chambered vessel containing water and encircling the foot of the shaft, and a plate or disk on the shaft rotating freely within the vessel and operating to force the water which is above it centrifugally, whereby a pressure of water is created below it equal to the maximum pressure above.

More particularly, my invention consists in a vessel containing water and encircling the foot of the shaft, which is guided centrally therein, a disk or plate upon the shaft and within the vessel, said disk or plate having a diameter less than the interior diameter of the vessel, whereby an annular space is left between its rim and the inner surface of said vessel, radial blades or flanges formed upon the upper surface of the disk or plate, and stationary radial ribs or flanges formed within the base of the vessel and under the plate or disk, whereby a permanent water-pressure is established through the agency of a forced vortex created by the rotation of the shaft and the flanged disk which it carries, which pressure, in acting against the disk on the shaft from below, is made to balance a portion or the whole of the load, as I shall hereinafter fully describe.

The object of my invention is to provide a hydraulic step for shafts by means of a permanent water-pressure created by the rotation of the shaft itself.

My invention is not only applicable to shafts placed vertically, but also to shafts placed in other positions—for example, horizontally, as in the case of a propeller-shaft, and wherein the shaft is subject to a thrust of any kind.

Figure 1:
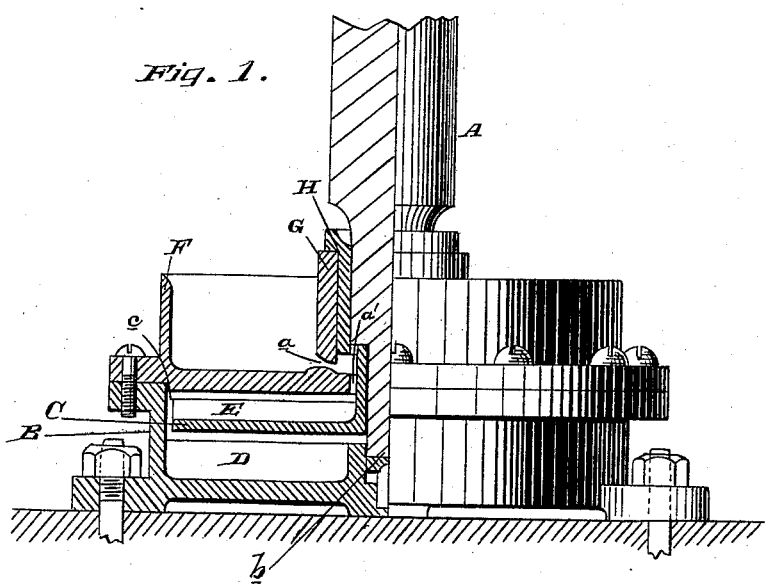
Figure 2:
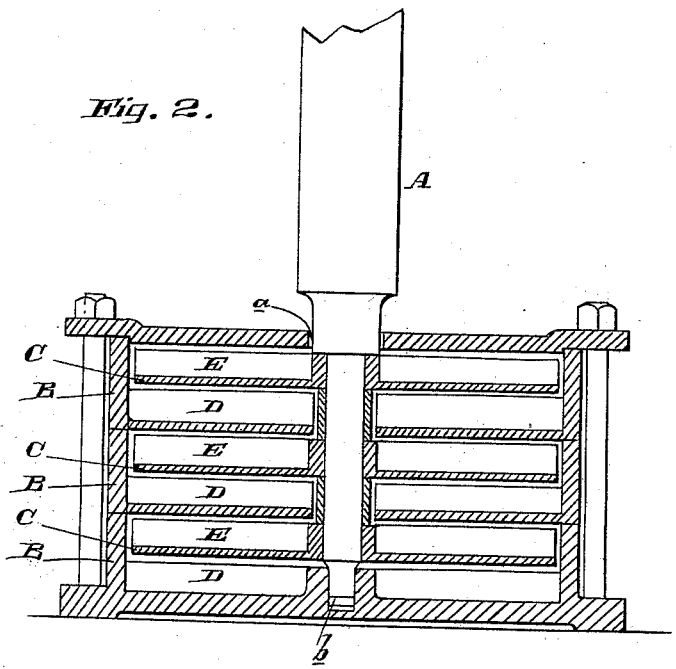

Referring to the accompanying drawings for a more complete explanation of my invention, Figure 1 is a half-elevation and half vertical section of my hydraulic step. Fig. 2 is a diagram showing a compound step, or one composed of a number of steps.

A is the shaft, and B is the cylindrical-chambered vessel in which the shaft is located centrally, its lower end being preferably guided by an ordinary step, *b*, in the base of said vessel. The lower portion of the shaft is turned down and has keyed rigidly to it a disk or plate, C, which occupies, approximately, the central horizontal plane of the chamber of the vessel B, and having a diameter enough less than the inner diameter of said vessel to leave an annular space, *c*, between its rim and the inner surface of the vessel. The plate or disk C thus divides the chamber of the vessel B into two compartments, and in the lower of these compartments is rigidly fixed or formed a series of radial ribs or flanges, D, the upper edges of which do not come in contact with the lower surface of the plate or disk. On the upper surface of the plate or disk is formed or secured a series of radial blades or flanges, E, the upper edges of which do not come in contact with the top of the vessel.

The outer rim of the top of the vessel is upturned, as shown at F, for the purpose of forming an inclosure for the water, so that the vessel B below may be kept full.

In order to guide the shaft accurately I may have an upturned annular flange, G, rising from the top of the vessel and bearing on a sleeve or journal-box, H, around the shaft. Through this flange are made holes *a*, and around the hub of the disk or plate C is formed an annular passage, *a'*, by reason of the top of the vessel having a hole greater in diameter than the diameter of the hub which passes through it, and this annular passage communicates with the holes *a* through the flange G, and also with the chamber of the vessel B, so that the water which is confined above has free access to and fills said chamber below.

The operation of this step is as follows: When the shaft rotates and the vessel B is filled with water, the blades or flanges on the upper surface of the plate or disk C cause the water to rotate with the same angular velocity. A forced vortex is thus created and the pressure of the water will increase from the center toward the circumference. The water in the space below the rotating disk or plate will be under a uniform pressure equal to the maximum pressure above. Hence the disk, and with it the shaft, will be under the influence of an upward pressure equal to the difference of the total pressure acting on both sides of the disk.

The purpose of the fixed ribs or flanges D in the vessel under the disk is to keep the water under said disk from rotating, so that throughout the entire space under the disk the pressure will be uniform and equal to the maximum pressure of the water above the disk, which, by its rotation, is toward the circumference.

Although I have here illustrated but one such vessel B and but one rotating disk C, it is obvious that I may compound these parts by having one or more intercommunicating vessels in a vertical series, through all of which the shaft passes, and having a disk or plate operating in each vessel, whereby the pressure of the water to support the shaft may be increased. This I have shown in diagram, Fig. 2.

Having thus described my invention, what I claim as new, and desire to secure by Letters Patent, is—

1. A hydraulic step for shafts, comprising a vessel containing water, said vessel having communicating chambers and surrounding the foot of the shaft, a ribbed disk or plate secured to said shaft, and fixed ribs or flanges in the vessel beneath the disk or plate, said disk rotating freely within the vessel and forcing the water above it centrifugally, whereby the pressure of water in the lower compartment is equal to the maximum pressure in the one above it.

2. A hydraulic step for shafts, consisting of a vessel encircling the foot of the shaft and containing water, a plate or disk fast upon the shaft and rotating freely within the vessel, blades or flanges on the upper surface of said disk or plate, and fixed ribs or flanges in the vessel under the plate or disk, substantially as herein described.

3. A hydraulic step for shafts, consisting of a vessel encircling the foot of the shaft and containing water, a plate or disk on the shaft and rotating freely in the vessel, blades or flanges on the upper surface of the plate or disk, fixed ribs or flanges in the base of the vessel under the plate or disk, and an inclosing-vessel in which the disk or plates operate, substantially as herein described.

In witness whereof I have hereunto set my hand.

FREDERICK G. HESSE.

Witnesses:
S. H. NOURSE,
H. C. LEE.